Patented Jan. 5, 1932

1,839,987

UNITED STATES PATENT OFFICE

MARIO MICHELS, OF STRASBOURG, FRANCE

MANUFACTURE OF ASH FREE SOLID FUEL

No Drawing.   Application filed July 25, 1929.   Serial No. 381,077.

It has long been attempted to prepare a fuel which is easily handled, non-poisonous, ash free and of high calorific value. Hitherto solid spirit and polymerized acetaldehyde (the so-called "meta") have chiefly come into use as spirit substitutes owing to their convenience in handling.

Solid spirit is simply gelatinized spirit, the gelatinizing agent being waxes and certain cellulose derivatives (sulphoacetates) which dissolve in hot alcohol and of which the solutions when cold stiffen into jellies.

The product known in commerce as "meta" is acetaldehyde in polymerized form, the preparation and properties of which have been fully described by J. Liebig.

The solid spirits have the disadvantage that when warm, and therefore when being burned they melt and after burning leave slag or resinous residues. The product known as "meta" has the disadvantage of being poisonous and of decomposing in warm surroundings and further is of low specific gravity. This product moreover does not yield the same heat as alcohol which is easily understandable since it can be classed as a burnt (oxidized) alcohol.

The present invention relates to a fuel for cooking, heating and illuminating purposes which possesses none of the above mentioned disadvantages and furthermore burns with a hot and non-sooting flame of good appearance and without residue. For making this fuel compounds of carbon, hydrogen and nitrogen but no oxygen are suitable. Among such compounds are the amines, the nitriles and the azo compounds. All these substances when being burnt yield a very great heat. If for example the heat of combustion of various organic compounds starting with $C_1$ are compared, the following values are obtained: methane 13200, methylamine 8400, methyl alcohol 5600, formalin 4000, formic acid 1500, formamide 3000, urea 2530 g. calories. The same sort of relationship between calorific values is met with among all organic compounds but less emphasized with increasing molecular weight.

It has now been found that among the amines, hexamethylenetetramine is particularly advantageous as a fuel and that it can be worked under heat or pressed into shape into small compressed bodies. This compound has the property that it burns with a steady, non-sooting, good blue flame, and without residue. It is well known that hexamethylenetetramine will not melt at ordinary atmospheric pressures which is also a great advantage since during burning it will not soil its support. Hexamethylenetetramine satisfies all the requirements of an ideal solid spirit. It yields approximately 7200 calories per gram, whilst spirit yields about 6500 and the so-called meta 6300 calories per gram. Hexamethylenetetramine is non-poisonous and stable, whilst the so-called meta is poisonous and sensitive to heat.

To the hexamethylenetetramine may be added suitable substances which exert an influence on the combustion so as to promote same, to color the flame and so on; for example ammonium carbonate, barium or strontium salts etc. may be used.

Example

Urotropine after admixture of ammonium carbonate and if necessary of trioxymethylene is formed or pressed in wet condition under strong heating. The pressed bodies thus prepared form the solid fuel.

What I claim is:—

1. A process for making an ash free solid fuel, consisting in forming a wet mass of hexamethylenetetramine with an admixture of ammonium carbonate under strong heating to small pressed bodies.

2. A process for making an ash free solid fuel, consisting in forming a wet mass of hexamethylenetetramine with an admixture of ammonium carbonate and trioxymethylene under strong heating to small pressed bodies.

In witness whereof I have hereunto signed my name this 9th day of July, 1929.

MARIO MICHELS.